UNITED STATES PATENT OFFICE.

CLIFFORD SAVILLE, OF NEW YORK, N. Y.

FOOD PRODUCT.

SPECIFICATION forming part of Letters Patent No. 472,644, dated April 12, 1892.

Application filed November 2, 1891. Serial No. 410,666. (No specimens.)

*To all whom it may concern:*

Be it known that I, CLIFFORD SAVILLE, a citizen of the United States of America, and a resident of New York, in the county of New York and State of New York, have invented a certain new and useful Food Product, of which the following is a specification.

My invention has reference to food compounds; and it has for its object the production of a food product from bananas.

By my invention I am enabled to convert bananas into a food product that may be kept any length of time and in any climate without deterioration, and which is nutritious, palatable, and cheap.

In carrying out my invention I take ripe bananas and, first divesting them of their peel, reduce the fruit to a pulp by any suitable manipulation, such as crushing in a mill or mixer, or by pressing through a sieve, the character of apparatus made use of being such as to prevent waste of the juice of the fruit. To the fruit pulp thus treated I add a sufficient quantity of starch—such as corn-starch, potato-starch, or wheat-starch, or I may use arrow-root or rice-flour—to absorb the moisture of the pulp and render the latter of the consistency of dough. The starch is thoroughly incorporated with the pulp by stirring, kneading, or otherwise. While any of the materials above enumerated may be combined with the fruit pulp, I prefer to employ corn-starch as giving in all respects the most satisfactory results, though I do not intend to limit the invention to the employment of corn-starch. The quantity of starch to be added to a definite quantity of the fruit pulp will depend, of course, upon the ripeness or juiciness of the fruit employed. The effect of the starch incorporated with the fruit pulp, serving, as stated, to absorb the moisture, and thus preserve the juice of the fruit, is to check fermentation by its quick-drying quality. In ripening the starch of the banana is converted into saccharine matter and the riper the fruit the smaller the proportion of the starch element. The incorporating of the starch with the fruit pulp, besides producing the mechanical effect of absorbing the moisture of the mass, thus enabling the product to be conveniently handled, also restores to the fruit the element (starch) converted into saccharine matter in the ripening process. The dough or stiffened mass of fruit pulp is rolled out or pressed into sheets or cakes, which are then thoroughly dried in any suitable manner—as, for example, in a kiln, oven, or drying-room. In the process of drying the sheets or cakes the essential parts of the juice of the fruit, being absorbed by the starch, are preserved. After the cakes or sheets of the compound are thoroughly dried they are pulverized or ground by any means that will serve to reduce the substance to a fine flour, in which condition it is put on the market.

My new food product will be found very nutritious and palatable and can be manufactured cheaply.

Bananas in an advanced state of ripeness may be utilized in preparing my food product with equally good results as those that are in prime condition, thus making it possible to utilize fruit that otherwise would be lost.

Heretofore bananas have been desiccated by being subjected to the influence of heat kept at a point above that which produces fermentation and below that which roasts or cooks. The fruit from which the moisture and juice have been thus evaporated may be, and perhaps has been, converted into a powder or flour before being used as a food. The loss of substance by desiccating the bananas must be very considerable, especially if fully ripe fruit is treated. My treatment of the bananas differs materially from this desiccating process. Instead of wasting the juice by evaporation I save it by incorporating the starch with the freshly-pulped bananas. The starch not only absorbs the juice, and thereby preserves it, but by its drying nature readily transforms the soft pulp into a dough-like material easily manipulated. Instead of a slow process of evaporation a quick-drying heat for the combination of ingredients is all that is needful in the production of my product, while the saving in weight of the fruit treated is obviously large. By saving the juice of the fruit, expediting the process of manufacture, and being able to utilize fruit so fully ripe and juicy that it would not be worth while to treat it by the desiccating or evaporating process I am enabled to obtain an economic food product from the banana.

My herein-described food product may be used for all culinary purposes, being adapted for making pudding, cakes, and desserts of various kinds. It is also adapted for making fancy crackers, &c., and also for making confections. It will likewise be found a most desirable food for invalids and infants.

Having thus described my invention, what I claim as new, and desire to secure by Letters Patent of the United States, is—

As a new article of manufacture, a food product consisting of banana fruit and starch combined and reduced to a flour, substantially as set forth.

Signed at New York, N. Y., this 31st day of October, 1891.

CLIFFORD SAVILLE.

Witnesses:
WM. C. BEHRENS,
M. C. PINCKNEY.